Figure 1:
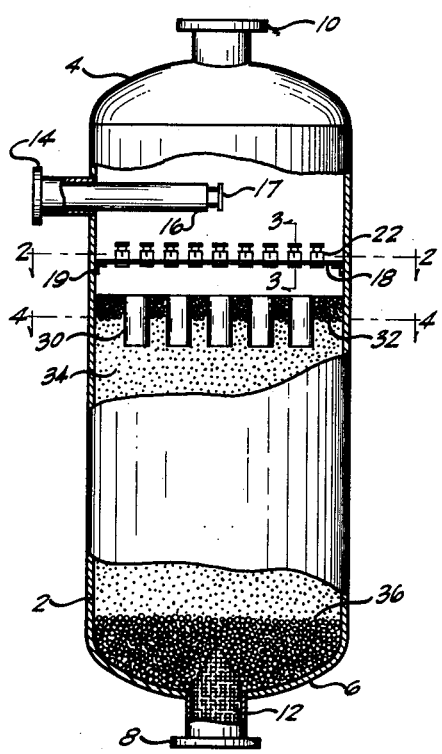

Nov. 26, 1963　　B. J. YOUNG ETAL　　3,112,256
DISTRIBUTION OF VAPOR-LIQUID FEEDS IN FIXED-BED REACTORS
Filed Jan. 11, 1960

INVENTORS
BILLY J. YOUNG
ARNOLD E. KELLEY
WILLIAM J. BARAL
BY
Lannas S. Henderson
AGENT United States Patent Office
3,112,256
Patented Nov. 26, 1963

3,112,256
DISTRIBUTION OF VAPOR-LIQUID FEEDS IN FIXED-BED REACTORS
Billy J. Young, Fullerton, Arnold E. Kelley, Anaheim, and William J. Baral, Long Beach, Calif., assignors to Union Oil Company of California, Los Angeles, Calif., a corporation of California
Filed Jan. 11, 1960, Ser. No. 1,505
12 Claims. (Cl. 208—213)

This invention relates generally to means and methods for distributing a vapor-liquid mixed phase feed to a granular solids contacting zone in a reactor. More particularly, this invention relates to a new and improved method and apparatus for uniformly distributing mixed phases in a downflow catalytic contactor such as a hydrodesulfurization reactor.

In general, the novel distribution apparatus of this invention comprises two basic elements, viz., (1) an upper liquid distribution tray adapted to receive the liquid portion of feed, and to discharge the same evenly over the reactor cross-section without substantially impeding the gas flow, and (2) one or more foraminous baskets immersed in the upper surface of the active particle-form solid contact bed immediately below the distribution tray, each of said baskets forming a cup-shaped cavity in the upper surface of the solids bed. The baskets are found to prolong and enhance the effect of uniform liquid feed distribution provided by the distribution tray. The combination produces an unexpected result, i.e., liquid and vapor distribution is far better than with either the distribution tray or the baskets by themselves. This better distribution manifests itself by higher catalyst activity at the same operating conditions, and greatly prolonged run lengths before shut down or regeneration.

Among the most important commercial processes are those involving the physical or chemical treatment of hydrocarbons and other organic materials with bodies of granular contact material. It has been found that in many of these contacting operations, a portion of the material fed to the solids bed is in the liquid phase, and certain phenomena occur which are injurious to the solid contact material, and the contacting efficiency. These phenomena are associated in many instances with the deposition of a layer of heavy material on the top of the solids bed, which may include foreign debris such as rust particles, and tarry or asphaltic material precipitated from the liquid feed. This heavy material, in remaining on the contact material for a considerable length of time, destroys or alters its efficiency and impedes the flow of fluids through the bed. Another problem, which is often aggravated by the above-noted deposition of heavy material, involves the difficulty of getting uniform distribution of liquid throughout the solids bed. In the past the reactants have generally been introduced into the upper portion of the solids bed through common perforated distribution tubes or plates. Especially in the treatment of charge stocks, as by destructive hydrogenation or catalytic and contact hydrodesulfurization, a mal-distribution of the process stream occurs due to the fact that there is a strong tendency for the liquid portion of the two-phase feed to fall into the catalytic reactor in a localized area, while the gaseous portion is distributed uniformly or, more likely, is forced preferentially through the portion of the catalyst bed not wetted by the liquid portion. Partial plugging of the upper catalyst layers by tarry materials in the preferentially liquid-wet areas further tends to accentuate this "channeling" problem. The result of this mal-distribution leads to a lower conversion of the feed, less efficient utilization of catalyst, and greater deposition of coke on the catalyst.

It is therefore an object of this invention to provide means and methods for uniformly distributing mixed phase feeds in catalytic downflow reactors, and for simultaneously removing foreign matter from the feed which might plug the catalytic bed, and for reducing the deleterious effects of tarry deposits in the initial contacting zones.

It is an additional object to provide for the uniform distribution of the coke formed as a result of reaction throughout a catalyst bed, and to minimize its formation.

Another object is to provide for increased conversion to a desired reaction product of a mixed liquid-vapor phase charge.

It is a still further object of this invention to provide a method of introducing a mixed-phase feed to a catalytic reactor bed which method affords a much higher sustained catalyst activity and a greatly reduced pressure drop buildup during each run length, thus providing optimum utilization of the catalytic material.

We have now found that by the use of distribution apparatus such as that described herein there is a great improvement in catalyst activity and a substantial elimination of bed plugging manifested by reduced pressure drop through the reactor.

Figure 2:
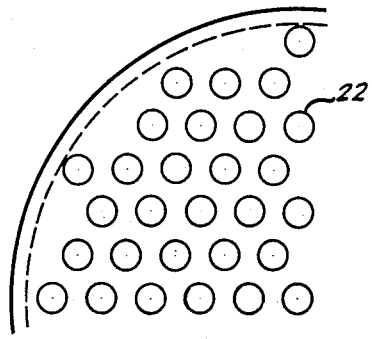
Figure 3:
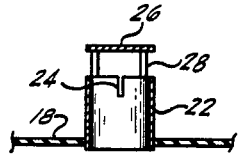
Figure 4:
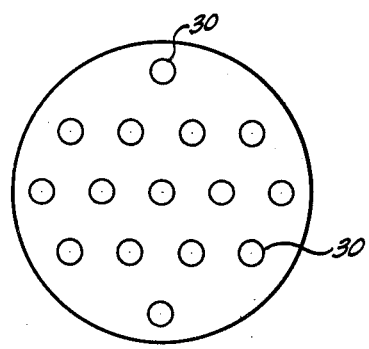
Figure 5:
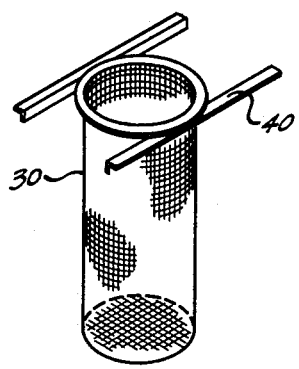

The invention will be more readily understood by reference to the accompanying drawings which form a part of this application. FIGURE 1 is a vertical section of a reactor. FIGURE 2 is a plan view of a distribution tray taken along line 2—2 of FIGURE 1. FIGURE 3 is a vertical section of a downcomer taken along line 3—3 of FIGURE 1. FIGURE 4 is a plan view of the basket arrangement taken along line 4—4 of FIGURE 1. FIGURE 5 is an illustration in perspective of a basket and suitable supporting structure as shown in FIGURES 1 and 4. It is to be understood that although the mixed phase distribution method and apparatus of this invention are broadly applicable to any downflow solids contacting system, they are particularly useful in catalytic reaction systems. The process and the disclosed apparatus are specifically described in connection with hydrosulfurization, but the apparatus disclosed can also be used to conduct any treatment in which a portion of the reactants is in liquid phase such as hydrocracking, polymerization, isomerization, catalytic hydrogenation of liquid coal extracts, catalytic hydrogenation of aromatic compounds such as the conversion of benzene to cyclohexane, catalytic oxidation, catalytic chlorination and the like.

Referring now more particularly to FIGURE 1, the apparatus there shown consists essentially of a downflow catalytic reactor with its various internals. Cylindrical vessel 2, having a top 4 and a bottom 6, is usually constructed of corrosion-resistant material and is normally insulated for operation at elevated temperatures. While the outer shell of the reactor is substantially cylindrical in the preferred form of our apparatus, it can be modified to a non-cylindrical shape. Outlet conduit 8 is provided in bottom 6. Vessel top 4 is provided with access conduit 10 for convenience in filling vessel 2 with catalyst, and for routine maintenance. A foraminous, cylindrical grating 12, located immediately above outlet conduit 8, is provided to disengage fluid product from the solids within vessel 2. Feed inlet conduit 14 communicates with sparger 16 which comprises an open pipe with splash plate 17 normally projecting 3–5 inches from the open end. Sparger 16 introduces the mixed phase (vapor-liquid) feed into the top of vessel 2.

The foregoing constitute conventional elements found in many catalytic reactors. According to our invention, a novel feed distribution system is provided in the form of transverse partition or distribution tray 18 and baskets 30. Distribution tray 18 is securely mounted substantially horizontally within vessel 2 in any suitable manner, such as by angles 19 or by other conventional supports such as channels, angles, brackets and the like. Tray 18 is solid, i.e., vapor and liquid tight, except for a plurality of downcomers 22. FIGURE 2 shows in plan view a suitable arrangement of cylindrical downcomers 22 on tray 18. Downcomers 22 should be distributed substantially uniformly on tray 18, but can have any desired configuration, i.e., squares, rectangles, triangles, etc. As illustrated more particularly in FIGURE 3, downcomer 22 of tray 18 is provided with one or more slots 24 or notches spaced around the upper circumference thereof, to provide for liquid overflow from tray 18 down through each downcomer. A cover plate 26 is provided above downcomer 22, usually from about ½ to about 2 inches above the top of the downcomer. Cover plate 26, held in place by supports 28, prevents liquid splash from sparger 16 from directly entering the downcomer, and thus precludes any bypassing of the liquid-distributing action of tray 18. One of the design considerations for our distribution tray 18 is that there is sufficient downcomer conduit area to give a negligible pressure drop across the tray from the passage of the mixed phase feed therethrough. Typical downcomers are, for example, about 1–8 inches in diameter, and have heights of from about 2 inches to about 8 inches, with the slots 24 or serrations normally extending from the top of the downcomer to a point no closer than about one inch from the tray. The notches or slots 24 are conventionally from about ⅛ to about ½ inch in width, and the lower extremities thereof are spaced substantially equidistant above the upper surface of tray 18. The bottoms of risers 22 usually protrude slightly below the bottom of tray 18 for better liquid disengaging onto the reactor bed surface.

Cylindrical baskets 30 are located beneath tray 18, and are immersed in catalyst bed 34 and an optional upper layer of ceramic balls 32. FIGURE 4 shows a suitable plan arrangement of baskets 30 provided in reactor 2 of FIGURE 1. The top of catalyst bed 34 is usually brought as close to the bottom of tray 18 as practicable. The baskets are usually installed with spacers 40 (FIGURE 5) to hold them in position, but can be essentially free floating, i.e., physically supported by the catalyst bed itself. The baskets 30 are constructed of a wire mesh, the mesh size being a maximum as limited by catalyst size, but can have any foraminous structure which has negligible pressure drop such as perforated sheet and the like. Preferably, the material of construction for baskets 30 is a corrosion-resistant material such as stainless steel, but any structural material which is sufficiently rigid to retain its shape under pressure of the solids bed is satisfactory. Baskets 30 can have essentially any geometric configuration with either open or closed bottoms but usually are cylindrical and open at the upper end with diameters from about 2 to about 8 inches and a length of from about 1 to 4 feet. The baskets can all be of the same diameter and length, or a range of different-sized baskets of various lengths and diameters can be utilized. The length of the baskets 30 in relation to the length of the catalyst mass 34 can vary appreciably. However, there must be a sufficient catalyst mass between the bottom of the baskets 30 and outlet conduit 8 to effect the desired conversion of that portion of the feed which is distributed into catalyst bed 34 from the lowest point in the baskets. It is conventional to place ceramic balls 32 or some other inert particles such as "Alundum" pellets to a depth of from about 3 inches to about 6 inches on the top of catalyst bed 34. The chemically inert pellets improve the substantially uniform distribution of the feed from the distribution tray and tend to prevent disruption of the upper catalyst surface. While baskets 30 are normally empty, they can be filled with ceramic balls or the like, which usually have a greater mean diameter than the granular catalyst, with substantially no alteration in the operation or function of baskets 30. FIGURE 5 illustrates in detail the wire mesh baskets 30 spaced by optional angle support 40.

For the purpose of illustrating a preferred embodiment, the present invention will be described with particular reference to a catalytic reactor adapted to the catalytic hydrodesulfurization of hydrocarbons. Application of the same reactor, or obvious modifications thereof, to other hydrocarbon conversions or treatments, or the conversion or treatment of other fluids will be obvious to those skilled in the art. The feedstock is a heavy coker distillate in mixed liquid-vapor phase. The proportion of liquid and vapor phase depends on the particular composition of the feedstock and the temperature and pressure, but normally contains from about 5 to about 25 percent liquid by weight. The liquid phase is usually distributed in the vapor phase in the form of a mist or droplets. This mixed-phase feed flows into the upper portion of reactor 2 through inlet conduit 14 and sparger 16. The liquid portion is distributed onto tray 18 by sparger 16 which reduces splashing and vessel wall erosion from feed impingement. The liquid phase, disengaged from the vapor phase by gravity, builds up on tray 18 to a level slightly above the bottoms of slots 24 in downcomers 22.

The slots in risers 22 effect uniform distribution by assuring that some liquid flows down each riser, relatively independently of local surges resulting from wave action at the surface of the liquid on tray. The slots 24, being narrow apertures restricting flow into each downcomer 22, have the effect of increasing the liquid height or head above the bottom of each slot to a level sufficient to balance the pressure drop of the flow of liquid from distribution tray 18. The liquid level above the bottom of slots 24 on tray 18 increases or decreases as the liquid content of the feed increases or decreases. Thus, in the preferred slotted downcomer design, even though distribution tray 18 is not absolutely horizontal, every downcomer 22 receives substantial liquid flow insuring a relatively uniform distribution of liquid reactants to catalyst bed 34 below. The liquid and vapor phases flow simultaneously downwardly through downcomers 22 onto the top of the reactors solids bed. The reactant mixture then flows downwardly into the catalyst bed, primarily through baskets 30, while a minor portion passes through the solids bed surface not displaced by baskets.

The function of baskets 30 is here manifested by an increase in the active life of the catalyst between regenerations, and by a reduction in the tendency for pressure drop to increase across the reactor bed. Both of these results presumably stem from the extended vertical surface area which is provided for the ingress of reactants. Thus, flow through baskets 30 provides an entry into reactor catalyst bed 34 through a vertical interface which is more resistant to scumming or plugging. Most of the feed flows into baskets 30 and out through the mesh bottoms and sides into the catalyst bed 34. Any foreign material in the feed, such as rust particles from transfer lines and heater tubes, gravitates to the bottoms of baskets 30 and accumulates. However, this buildup of material in the basket bottoms is very gradual, and the feed can readily flow through the vertical basket sides. Thus, the buildup of pressure drop through the reactor proceeds at a very low rate, and usually shutdown or regeneration is due to catalyst deactivation rather than from plugging or scumming of the upper catalyst surface.

The vapor and liquid reactants, now intimately mixed, pass through catalyst bed 34, optional inert support bed 36, normally comprising ceramic spheres, and grating 12 into outlet conduit 8. The hydrodesulfurized product is removed from vessel 2 via outlet conduit 8 to product storage or further processing. A particular advantage of the feed distribution apparatus of our invention is its satisfactory performance over a wide fluctuating range of feed rates so prevalent in petroleum processing.

The above and other objects and advantages of the invention will become more apparent from the following description of an exemplary embodiment of the invention performed in an apparatus similar to that shown in the drawings. In an apparatus substantially identical to the reactor of FIGURE 1, a series of hydrodesulfurization runs were conducted. The runs comprised a first series (I) without the feed distribution internals of our invention, i.e., no distribution tray 18 or baskets 30; a second series (II) with baskets 30 removed, i.e., only distribution tray 18 for distributing feed; a third series (III) with tray 18 removed, i.e., only baskets 30 for distribution; and a fourth series (IV) conducted with both the distribution tray 18 and the baskets 30 incorporated within the reactor essentially as shown in FIGURE 1. In all four series of runs the top 6 inches of the contacting bed comprised ¾-inch ceramic balls essentially as shown in FIGURE 1. Pertinent details of the equipment used in these runs are tabulated in Table 1.

Table 1

| | |
|---|---|
| Reactor diameter | 7 feet. |
| Reactor length | 22 feet. |
| Downcomer diameter | 2-inch pipe, Sch. 40. |
| Downcomer height | 6 inches. |
| Downcomer slots | Two slots per downcomer located 180° apart (1" long and ⅛" wide). |
| Number of downcomers | 128, uniformly distributed over tray. |
| Basket diameter | 6 inches. |
| Basket length | 2 feet. |
| Basket mesh | 7 mesh—0.063 in. wire, stainless 304. |
| Number of baskets | 20, uniformly distributed over reactor bed. |
| Catalyst charge | 50,000 lb. of ⅛-inch pelletted cobalt molybdate hydrodesulfurization catalyst. |

All the runs conducted so as to maintain a constant degree of sulfur removal by incremental temperature increases over each run, until the maximum allowable operating temperature was reached. At the start of each run the reactor, at a pressure of about 800 p.s.i.g., contained a charge of freshly regenerated catalyst having an initial bed temperature of about 675° F. The feed, comprising heavy vacuum straight run and fluid coker distillates from a Wyoming sour crude, was treated at an average rate of about 10,000 bbls./stream day until the temperature reached 800° F., and sulfur removal dropped to below 80 percent. The feed, containing about 2.5 weight percent sulfur, had an initial boiling point of about 400° F. and a final boiling point of about 1,050° F. The length of each run, expressed as barrels of feed treated per pound of catalyst charge, is tabulated in Table 2.

Table 2

| Run Series | Feed Distribution Internals | Run Length, avg. bbls./lb. |
|---|---|---|
| I | None | 4 |
| II | Tray | 5 |
| III | Baskets | 5 |
| IV | Tray plus Baskets | 12 |

Thus, the distribution tray alone and the baskets alone give only a slight improvement in run length, but the combination of tray and baskets products a synergistic effect giving the unexpectedly high level of performance shown in Table 2.

Various other changes and modifications of this invention are apparent from the description of this invention and further modifications will be obvious to those skilled in the art. Such modifications and changes are intended to be included within the scope of this invention as defined by the following claims.

We claim:
1. An apparatus for contacting a liquid-vapor mixture with a bed of particle-form solids comprising in combination a closed vessel adapted to contain therein a solids bed extending from a lower to an upper level; inlet means in the upper portion of said vessel above said upper level; outlet means in the lower portion of said vessel below said lower level; a substantially horizontal liquid distribution tray mounted in the upper portion of said vessel between said inlet means and said upper level of said solids bed, said tray being a reservoir basin having a plurality of substantially uniformly spaced openings and having a plurality of conduits, each conduit extending upwardly from and connected to one of said openings in said distribution tray, said conduits extending substantially equally upwardly from said openings to a point substantially below said inlet thereby allowing the maintenance of a liquid level on said horizontal liquid distribution tray; and foraminous basket means spaced apart from and below said horizontal liquid distribution tray and supported in said solids bed and extending downwardly therein from said upper level of said solids bed thereby defining fluid-permeable cavities in the upper surface of said solids bed.

2. An apparatus as defined in claim 1 including liquid overflow ports spaced circumferentially in said conduits and substantially equidistantly above said distribution tray, and cover plates supported and spaced substantially above said conduits.

3. An apparatus as defined in claim 2 wherein said conduits are cylinders having a diameter between about one and about eight inches in diameter and a height between about two and about eight inches.

4. An apparatus as defined in claim 2 wherein said liquid overflow ports consist of vertical notches cut downwardly from the top of said conduits.

5. An apparatus as defined in claim 1 wherein said basket means comprises at least one wire-mesh cell having an open top and a closed bottom, the openings in said wire-mesh being smaller than the particle size of said particle-form solids.

6. An apparatus as defined in claim 5 wherein said wire-mesh cell is substantially cylindrical and has a diameter between about two and about eight inches and a length between about one and about four feet.

7. An apparatus as defined in claim 1 wherein said particle-form solids comprise a granular catalyst, and in combination therewith a layer of inert solid pellets having a mean diameter at least as great as said granular catalyst, said layer extending from the upper catalyst level to the top of said foraminous basket means.

8. A catalytic reactor for contacting a mixed phase feed comprising a liquid component and a gaseous component, comprising in combination a vertically arranged closed cylindrical shell adapted to hold and retain a stationary catalyst bed in its lower portion; inlet means for introducing said feed into the upper portion of said shell; a substantially horizontal transverse partition mounted between the upper and lower portions of said shell, said partition having a plurality of substantially uniformly spaced conduits extending therethrough and upwardly therefrom so as to form a liquid reservoir on said horizontal transverse partition, said conduits communicating said upper portion with said lower portion of said shell; at least one foraminous cell spaced apart from and below said transverse partition extending downwardly into said catalyst bed forming a fluid-permeable cavity in the upper surface thereof, and outlet means located in the lower portion of said shell below said catalyst bed for withdrawing reaction products therefrom.

9. An apparatus as defined in claim 8 including a plurality of said foraminous cells distributed at spaced, regular intervals in the upper surface of said catalyst bed.

10. A process for contacting a mixture of liquid and vapor reactants with a bed of active particle-form solids contained in a contacting vessel which process comprises introducing said mixture through an inlet conduit into the top portion of said vessel; disengaging said liquid from said vapor; collecting said liquid in a horizontal liquid reservoir located beneath said inlet conduit; discharging liquid downwardly from said liquid reservoir uniformly over the cross-sectional area of said contacting vessel; introducing a major portion of said liquid and vapor traversing said reservoir radially into a plurality of cavities in the upper portion of said bed of particulate-form solids; passing a minor portion of said liquid and vapor traversing said reservoir downwardly directly into the non-cavitated upper portion of said solids bed; flowing said major and minor portions thence downwardly through said solids bed; and withdrawing reaction products from said solids bed.

11. A process as defined in claim 10 wherein said contacting comprises a catalytic hydrocarbon conversion.

12. A process as defined in claim 10 wherein said contacting comprises a catalytic hydrodesulfurization.

References Cited in the file of this patent

UNITED STATES PATENTS

| | | |
|---|---|---|
| 2,494,337 | Hemminger | Jan. 10, 1910 |
| 2,886,517 | Patton et al. | May 12, 1959 |
| 2,898,292 | Halik et al. | Aug. 4, 1959 |
| 2,961,304 | Collins | Nov. 22, 1960 |
| 3,006,740 | Maggio | Oct. 31, 1961 |